United States Patent
Nieuwejaar

(12) 
(10) Patent No.: US 6,463,465 B1
(45) Date of Patent: Oct. 8, 2002

(54) SYSTEM FOR FACILITATING REMOTE ACCESS TO PARALLEL FILE SYSTEM IN A NETWORK USING PRIVILIGED KERNEL MODE AND UNPRIVILIGED USER MODE TO AVOID PROCESSING FAILURE

(75) Inventor: Nils Nieuwejaar, Bedford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/306,967

(22) Filed: May 7, 1999

(51) Int. Cl.[7] .............................................. G06F 15/16
(52) U.S. Cl. ..................... 709/217; 709/212; 709/213; 709/216; 709/219
(58) Field of Search ................................ 709/107, 201, 709/202, 203, 206, 212, 213, 216, 217, 218, 219

(56) References Cited

U.S. PATENT DOCUMENTS

| | | | |
|---|---|---|---|
| 5,551,051 A | * 8/1996 | Silverthorn et al. | 709/107 |
| 5,737,549 A | * 4/1998 | Hersch et al. | 710/129 |
| 5,920,702 A | * 7/1999 | Bleidt et al. | 709/231 |
| 5,931,918 A | * 8/1999 | Row et al. | 709/300 |
| 5,963,731 A | * 10/1999 | Sagawa et al. | 703/6 |
| 6,269,376 B1 | * 7/2001 | Dhillon et al. | 707/101 |
| 6,292,822 B1 | * 9/2001 | Hardwick | 709/105 |

* cited by examiner

Primary Examiner—Meng-Al T. An
Assistant Examiner—Nabil El-Hady
(74) Attorney, Agent, or Firm—Chapin & Huang, L.L.C.; Barry W. Chapin

(57) ABSTRACT

A parallel filesystem remote access subsystem facilitates remote access to files in a parallel filesystem in a digital computer network, the network including at least one client computer and a plurality of server computers interconnected by a communication link, and each server computer storing a portion of at least one file in the parallel filesystem. The parallel filesystem remote access subsystem includes, associated with the server computer, a parallel filesystem input/output daemon, and, associated with the client computer, a parallel filesystem module and a parallel filesystem proxy daemon. The parallel filesystem module receives access requests generated to access a file in the parallel filesystem and refer the access requests to the parallel filesystem proxy daemon, and the parallel filesystem proxy daemon, in turn, generates server access request messages for transfer over the communications link. The client computer processes the parallel filesystems module in a privileged kernel mode and the parallel filesystem proxy daemon in an unprivileged user mode. The a parallel filesystem input/output daemon, which is processed in the server computer's user mode, controls processing of server access request messages received by the server computer over the communication link.

33 Claims, 4 Drawing Sheets

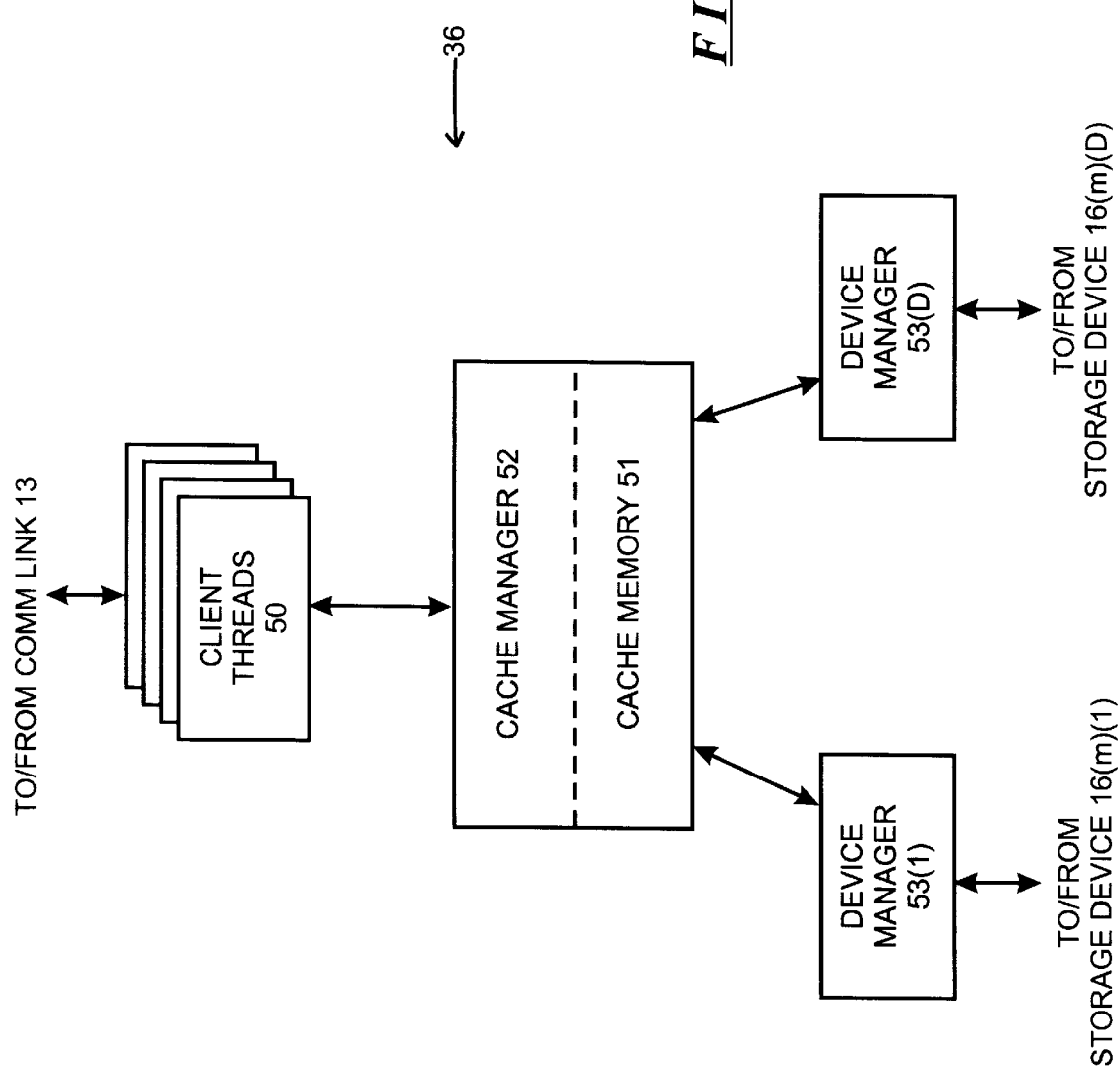

SYSTEM FOR FACILITATING REMOTE ACCESS TO PARALLEL FILE SYSTEM IN A NETWORK USING PRIVILIGED KERNEL MODE AND UNPRIVILIGED USER MODE TO AVOID PROCESSING FAILURE

FIELD OF THE INVENTION

The invention relates generally to the field of digital computer systems, and more particularly to systems and methods for facilitating remote access to parallel filesystems.

BACKGROUND OF THE INVENTION

In modern "enterprise" computing, a number of personal computers, workstations, and other devices such as mass storage subsystems, network printers and interfaces to the public telephony system, are typically interconnected in one or more computer networks. The personal computers and workstations are used by individual users to perform processing in connection with data and programs that may be stored in the mass storage subsystems. In such an arrangement, the personal computers/workstations, operating as clients, typically download the data and programs from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations being interconnected by communication links such as electrical wires or optic fibers.

Data processed by computers is organized into files, which, in turn, are organized in filesystems maintained on the mass storage subsystems. A filesystem can be an "ordinary" filesystem, which is maintained on a single mass storage subsystem on a single server, or a parallel filesystem ("PFS"), which is maintained on mass storage subsystems maintained by a plurality of servers. In a PFS, a file is striped across mass storage subsystems maintained by a plurality of servers, and, when a file is retrieved or updated by a client, the servers can perform a portion of the retrieval or update operation in parallel, potentially resulting in faster completion.

A problem arises in connection with accessing files in a PFS in that the client computer and server computer(s) on which the PFS is maintained need to communicate over the network. Currently, the communications take place between the client computer's operating system and the server computer. In that case, communication errors can cause a failure in the operating system, which, in turn, can result in failure of all processing (a so-called "crash") in connection with the client computer.

SUMMARY OF THE INVENTION

The invention provides a new and improved system and method for facilitating remote access to parallel filesystems.

In brief summary, the invention provides a parallel filesystem remote access subsystem that facilitates remote access to files in a parallel filesystem in a digital computer network, the network including at least one client computer and a plurality of server computers interconnected by a communication link, and each server computer storing a portion of at least one file in the parallel filesystem. The parallel filesystem remote access subsystem includes, associated with the server computer, a parallel filesystem input/output daemon, and, associated with the client computer, a parallel filesystem module and a parallel filesystem proxy daemon. The parallel filesystem module receives access requests generated to access a file in the parallel filesystem and refer the access requests to the parallel filesystem proxy daemon, and the parallel filesystem proxy daemon, in turn, generates server access request messages for transfer over the communications link. The client computer processes the parallel filesystems module in a privileged kernel mode and the parallel filesystem proxy daemon in an unprivileged user mode. The a parallel filesystem input/output daemon, which is processed in the server computer's user mode, controls processing of server access request messages received by the server computer over the communication link.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3 and 4 schematically depict structures useful in understanding the operation of the parallel filesystem access subsystem.

DETAILED DESCRIPTION OF AN ILLUSTRATIVE EMBODIMENT

Figure 1:
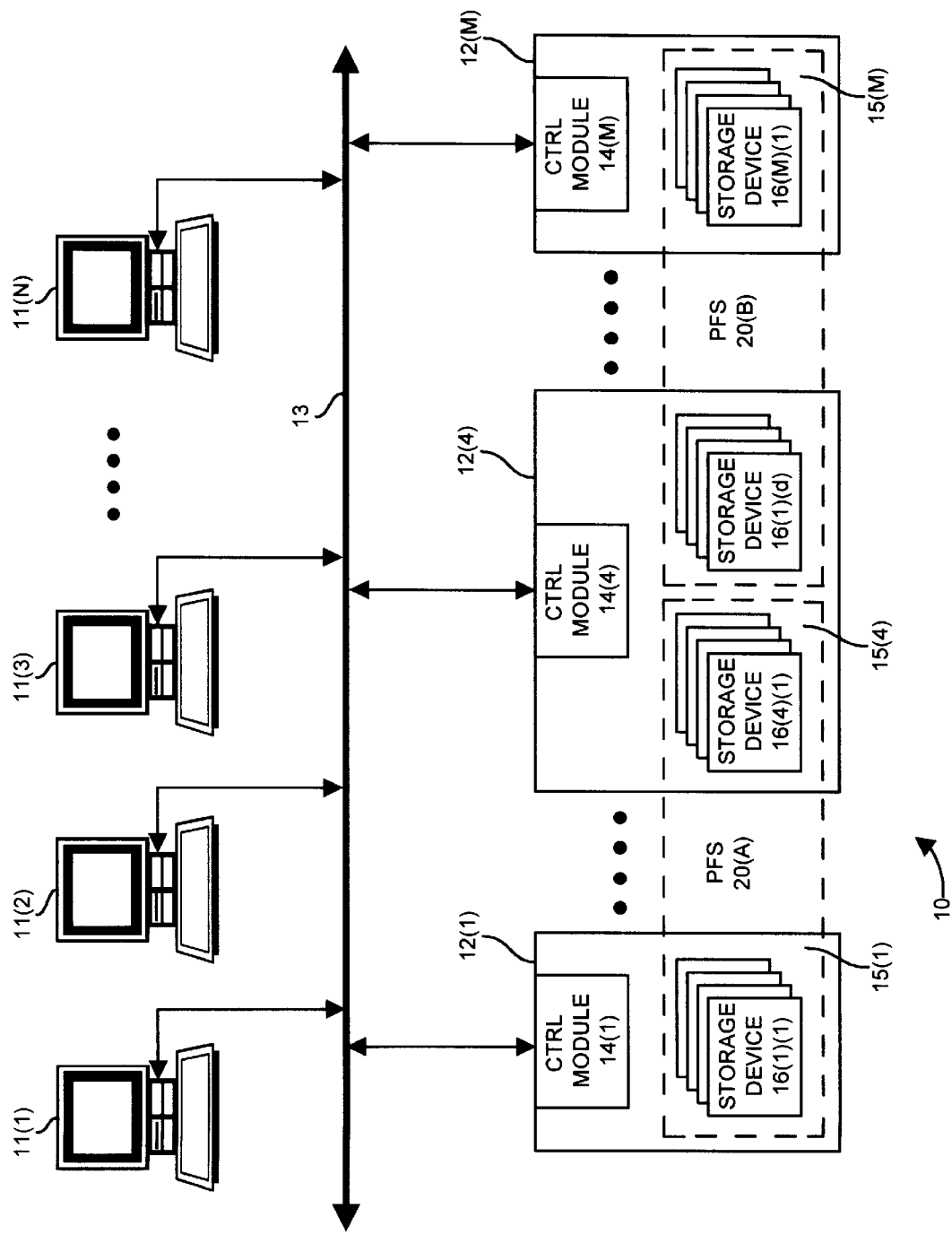
FIG. 1 schematically depicts a computer network including a subsystem for accessing a parallel filesystem constructed in accordance with the invention.

FIG. 1 schematically depicts a computer network 10 including a subsystem for accessing a parallel filesystem constructed in accordance with the invention. With reference to FIG. 1, network 10 includes a plurality of client computers 11(1) through 11(N) (generally identified by reference numeral 11($n$)) and server computers 12(1) through 12(M) (generally identified by reference numeral 12($m$)) which are interconnected by a communication link 13. As is conventional, the client computers 11($n$) are of the conventional stored-program computer architecture. The client computers 11($n$) may be in the form of personal computers or computer workstations, each of which includes a system unit, a video display unit and operator input devices such as a keyboard and mouse. A system unit generally includes processing, memory, mass storage devices such as disk and/or tape storage elements and other elements (not separately shown), including network interface elements for interfacing the respective client computer system 11($n$) to the communication link 13. A video display unit permits the computer to display processed data and processing status to the user, and an operator input device enable the user to input data and control processing by the computer.

The server computers 12($m$) are also of the conventional stored-program computer architecture. Each server computer 12($m$) includes a control unit 14($m$) and a mass storage subsystem 15($m$) including one or more storage devices 16($m$)(1) through 16($m$)(D$_x$) (generally identified by reference numeral 16(m)(d)) such as disk drives or the like. The control unit 14(m) includes processing, memory, and other elements, such as network interface elements for interfacing the respective server computer 12(m) to the communication link 13. The mass storage subsystems 15(m) store data which, for example, can be downloaded by the client computers 11(n) for processing, display to the client computers' respective operators, and the like. In addition, the mass storage subsystems 15(m) can store data which has been uploaded to the respective server computers for storage. The server computers 12(m) may also include operator input and output devices, which typically will be used to allow an administrator to configure and control the respective server computer 12(m).

The computers 11(n) and 12(m) transfer data, in the form of messages, through their respective network interface devices, among each other over the communication link 13. The communication link 13 interconnecting the client computers 11(n) and server computer 12(m) in the network 10 may, as is conventional, comprise wires, optical fibers or other media for carrying signals representing information among the computers 11(n) and 12(m).

The data stored in the mass storage subsystems 15(m) is organized in files, with each file being accessible through one or more filesystems. The filesystem allows the data in a file to be stored and thereafter located and retrieved in a logical manner. In network 10, some of the files may be stored on one or more storage devices 16(m)(d) on one of the server computers 12(m). In addition, the server computers 12(m) provide one or more parallel filesystems ("PFS's") 20(A), 20(B) in which portions of each file in the parallel filesystem are stored on at least one storage device 16(m)(d) on a plurality of server computers 12(m). In one embodiment, each file in a parallel filesystem are striped across the storage devices 16(m)(d) on which the parallel filesystem is stored. Thus, for example, if server computers 12(1) through 12(4) participate in one parallel filesystem, and if, in each of the server computers 12(1) through 12(4), the files in the parallel filesystem are stored on storage devices 16(m)(1) (m=1, . . . ,4), then a file in the parallel filesystem will be stored on storage devices 16(1)(1) through 16(4)(1) such that a first block of the file will be stored on storage device 16(1)(1), a second block on storage device 16(2)(1), a third block on storage device 16(3)(1) and a fourth block on storage device 16(4)(1). The blocks will be of uniform size, as determined by the storage device, and will stored at the same location on the respective storage devices 16(1)(1) through 16(4)(1), thereby occupying a "stripe" on the storage devices 16(m)(1) (m=1, . . . ,4). If the file is larger than four blocks, the fifth block through eighth (if any) blocks will be stored on blocks comprising another stripe across the storage devices 16(m)(1) (m=1, . . . ,4), and so forth. By storing the data in a file in a stripe across a plurality of storage devices 16(m)(d_x) on a plurality of server computers 12(m), if a file to be accessed is large, all of the server computers 12(m) can participate in the access operation, which can significantly reduce the time required for the access operation.

As noted above, a network can have multiple parallel filesystems. Network 10 is shown as having two parallel filesystems, including PFS 20(A) and PFS 20(B). The PFS's 20(A) and 20(B) overlap at server computers 12(4), but non-overlapping sets of storage devices, illustratively storage devices 16(4)(1) and 16(4)(2), on server computer 12(4) will be associated with the respective PFS's 20(A) and 20(B).

A client computer 11(n) can retrieve data in a file stored in a parallel filesystem, such as PFS 20(A), by first mounting the PFS 20(A), and thereafter transmitting retrieval request messages over the communication link 13 to the server computers 12(1) through 12(4) comprising the PFS 20(A) requesting the data from the file. If only a portion of a file is to be retrieved, the client computer 11(n) need transmit retrieval request messages only to the server computers whose storage devices 16(m)(d) store the required portion. The control units 14(m) of the server computers 12(m) which receive the retrieval request messages will enable the requested data to be retrieved from the storage devices 16(m)(d), and generate messages for transmission to the client computer 11(n) which issued the request including the requested data. Similarly, a client computer can, after the PFS 20(A) has been mounted, store data in a parallel file stored thereon by transmitting storage request messages over the communication link 13 to the server computers 12(1) through 12(4) comprising the PFS 20(A), the storage request messages including the data which is to be stored. If only a portion of a file is to be retrieved, the client computer 11(n) need transmit storage request messages only to the server computers whose storage devices 16(m)(d) maintain the portion of the file in which the data is to be stored. The control units 14(m) of the server computers 12(m) which receive the storage messages will enable the requested data to be stored on the appropriate locations of storage devices 16(m)(d). In either case, the operations can proceed on the server computers 12(m) in parallel. That is, for a retrieval operation, the server computers 12(m) can, after receiving the can retrieval request messages, retrieve the requested data and generate and transfer messages containing the data to the client computer 11(n), all in parallel. Similarly, for a storage operation, the server computers can receive the storage request messages and store the data in parallel. The processing of the storage and retrieval request messages in parallel can significantly reduce the time required to perform the requested operation. As is conventional, a filesystem, including PFS's 20(A) and 20(B) need only be mounted by a client computer 11(n) once, and, after the PFS has been mounted, requests for multiple storage and retrieval operations may be directed thereto; if the client computer 11(n) later de-mounts the PFS, it will thereafter have to be again mounted before it can perform access operations in connection with files therein.

Figure 2:
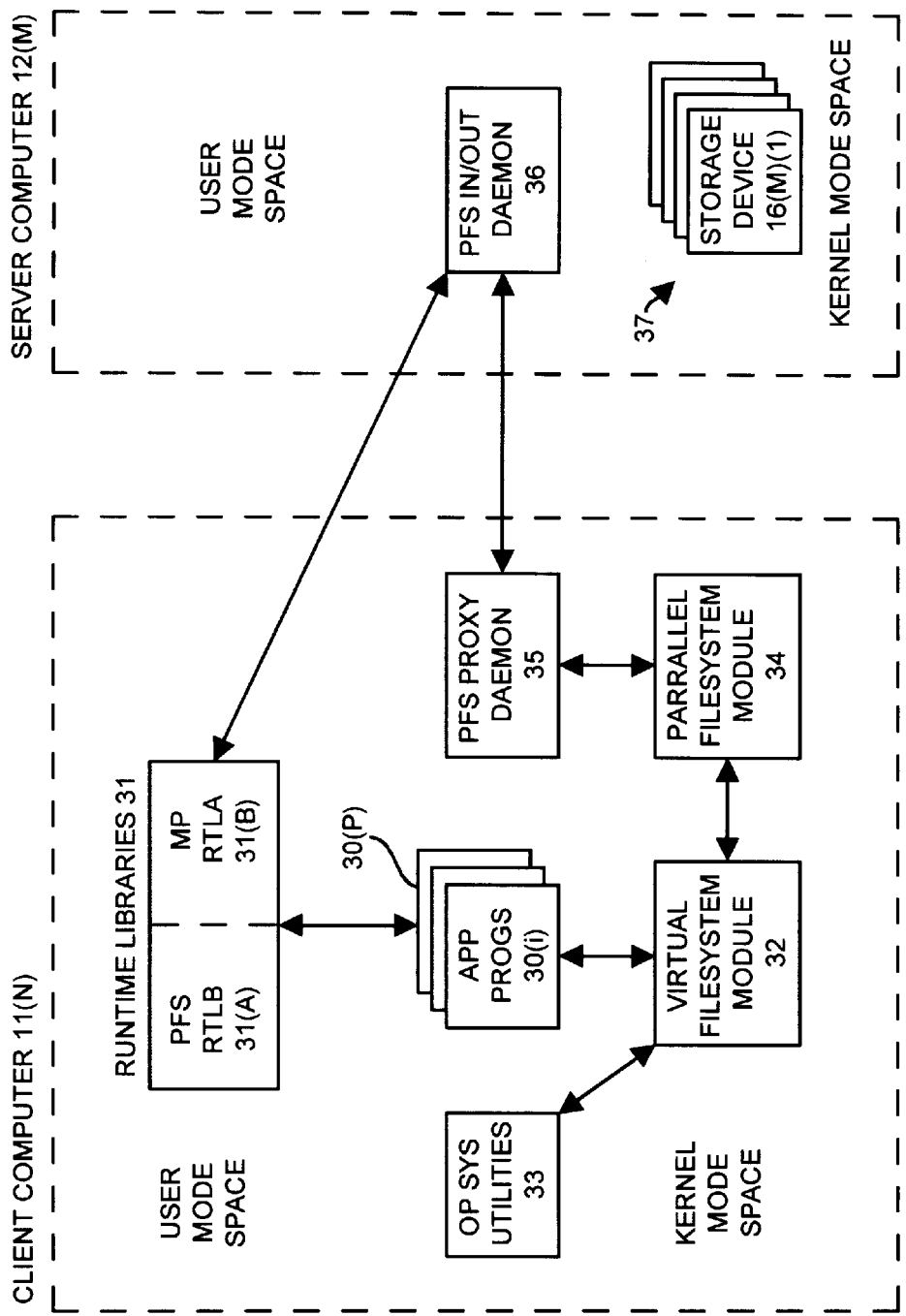
FIG. 2 schematically depicts the parallel filesystem access subsystem useful in the network depicted in FIG. 1.

The invention provides a parallel filesystem (PFS) access subsystem for handling access requests for files in a PFS. The PFS access subsystem will be described in connection with FIG. 2. FIG. 2 particularly depicts several components of a client computer 11(n) and one server computer 12(m) which maintains a storage device 16(m)(d) in a PFS 20 (which may be either or both of PFS 20(A) or 20(B)) which has been mounted by the client computer 11(n). The client computer 11 (n) includes a number of conventional components, including one or more application programs 30(1) through 30(P) (generally identified by reference numeral 30(p)), a set of runtime libraries 31, and a virtual filesystem module 32. The application programs perform processing operations in connection with data which may be stored in the files in the PFS 20, as well as other filesystems, which may include filesystems containing files on storage devices (not separately shown) which may be maintained on the client computer 11(n), as well as non-parallel filesystems which may be maintained by the server computers 12(m), which the client computer 11(n) may have mounted.

In their processing operations, the application programs 30(p) can make use of routines in the runtime libraries 31, which include, with specific respect to the invention, message passing routines which the application programs and other modules can use in their operations. In one embodiment, the runtime libraries 31 actually include a plurality of libraries, including a parallel filesystem runtime library 31(A) and a message passing runtime library 31(B). The parallel filesystem runtime library 31(A) contains routines that an application program 30(p) can use to access files in a PFS 20(A), 20(B) without use of the PFS access subsystem. The message passing runtime library contains message passing routines that can be used by the application programs and other modules to facilitate generation of messages for transfer thereamong. Several libraries of message passing routines are known in the art; in one embodiment, the message passing routines are from the well-known MPI ("message passing interface") library. Preferably, the message passing routines will be processed by the client computer 11(n) in an unprivileged "user" mode, which do not require calls to the client computer's operating system, which, in turn, allows the messages to be generated and transferred among the application programs and other modules making use of them (that is, the message passing routines) much faster than if calls to the operating system were required.

In their processing operations, the application programs 30(p) can also generate access requests in connection with data in files, whether stored locally on the client computer or remotely on one or more server computers 12(m), and whether in a parallel or non-parallel filesystem. The virtual filesystem module 32 operates as the intermediary to receive the requests and direct them to an appropriate module to handle the access request. In the case of an access request to a filesystem which is maintained locally on the client computer 11(n), the virtual filesystem module 32 will direct the request to another module (not shown) to process the request and retrieve data from, or store data on, the local storage devices as required by the request. The virtual filesystem module 32 forms part of the client computer's operating system, and in that connection is processed by the client computer 11(n) in the privileged "kernel" mode. In one embodiment, in which the operating system is Unix or a Unix-like operating system, a set of conventional Unix utilities 33 provided with the Unix operating system can also access data in files by generating access requests for handling by the virtual filesystem module 32.

In the case of an access request for a PFS 20, the virtual filesystem module 32 directs the request to the PFS access subsystem. The PFS access subsystem includes, on the client computer, a PFS module 34 and proxy daemon 35, and, on each server computer 12(m) which maintains a portion of the PFS 20, a PFS input/output daemon 36. The PFS module 34 is processed in kernel mode, whereas the PFS proxy daemon and PFS input/output daemon 36 are processed in user mode, the PFS input/output daemon 36 being specifically processed in respective the server computer's user mode. The PFS module 34 receives the access requests and enqueues them for handling by the PFS proxy daemon 35. The PFS proxy daemon 35, in turn, operating in user mode and using the message passing routines in the runtime libraries 31, directs the appropriate requests to the PFS input/output daemon(s) 36 in the one or ones of the server computers 12(m) which maintain the portion or portions of the file to be accessed. The PFS input/output daemon(s) 36 on the respective server computer(s) actually perform the access operation, communicating with message passing routines in the client computer's runtime libraries 31 in that operation.

For example, during a storage operation, in which data from the client computer 11(n) is to be stored on storage device(s) of one or more server computers 12(m), the PFS input/output daemon 36 on the respective server computer 12(m) communicates with the client computer's message passing routines in the runtime libraries 31 to enable the data to be stored thereon to be transferred thereto (that is, to the PFS input/output daemon 36) from the client computer's memory (not shown) without requiring intervention of other components, for example, the proxy daemon 35. After the PFS input/output daemon 36 receives data it can enable it (that is, the data) do be stored on the storage device 37. On the other hand, during a retrieval operation, in which data is to be retrieved from the storage device 37 for transmission to the client computer, the PFS input/output daemon 36 on the respective server computer 12(m), after receiving the request from the proxy daemon 35, retrieves the data to be retrieved from the storage device 37 and thereafter communicates with the client computer's message passing routines in the client computer's runtime memory to enable the data to be provided to the client computer's memory, also without requiring intervention of the proxy daemon 35.

In both cases, after the storage or retrieval operation has been completed, the PFS input/output daemon 36 will provide a status notification to the proxy daemon 35 indicating whether, for example, the operation was completed successfully. The proxy daemon 35, in turn, will provide the status notification to the PFS module 34, which will provide it (that is, the status notification) to the virtual filesystem module 32. Thereafter, the virtual filesystem module 32 will notify the application program 30. If the operation is a retrieval operation, the application program 30 can, for example, thereafter use the data in its processing operations. On the other hand, if the operation is a storage operation, the application program 30 or the client computer's operating system may enable the client computer to provide a notification to the operator on, for example, the client computer's video display. In any case, all communications between the proxy daemon 35 and the PFS input/output daemon 36 are preferably by means of messages using the message transfer protocol defined by the message passing routines provided by the runtime libraries.

Figure 3:
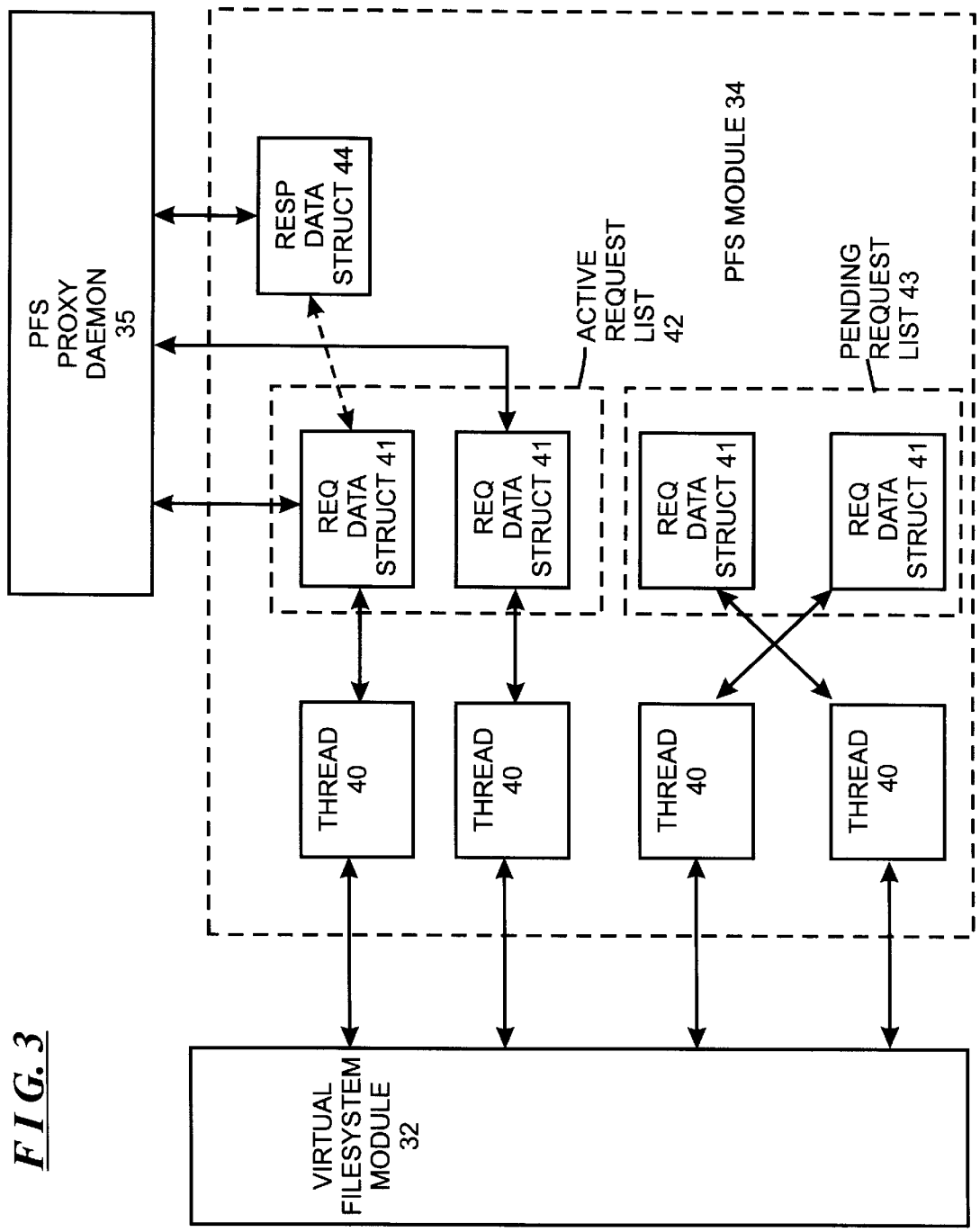

FIG. 3 schematically depicts structures useful in understanding the operation of the parallel filesystem access subsystem. FIG. 3 specifically depicts interfaces between the virtual filesystem module 32 and the PFS module 34 and the PFS module 34 and the PFS proxy daemon 35, and details of the PFS module 34. With reference to FIG. 3, when the PFS module 34 receives an access request from the virtual filesystem module 32, it establishes for each thread or process of the application program 30 which issued the request, represented by block 40, a request data structure 41 for each request. Request data structures 41 for access requests which are currently being processed are linked in an active request list 42, whereas request data structures 41 for access requests which are waiting to be processed are linked in a pending request queue 43. When the PFS module 34 can process another access request, the request data structure 41 at the head of the pending request queue 43 will be dequeued and linked to the active request list 42. Thereafter, the access request will be transferred to the PFS proxy daemon, which, in turn, identifies the particular server computers 12(m) which comprise the particular PFS 20 on which the file to be accessed is stored, and, using the message passing routines from the runtime libraries 31, transmit messages associated with the request to the PFS input/output daemons 36 of those server computers 12(m) as described above. Thereafter, the PFS input/output daemons 36 can process the request and generate messages including status notifications for transmission to the proxy daemon 35 as described above, After all PFS input/output daemons 36 to which messages associated with an access request were transmitted for an access operation have provided status notifications to the PFS proxy daemon 35, it can provide a composite status notification, represented by response data structure 44, to the PFS module 34 as described above. Thereafter the PFS module 34 can provide the composite status notification to the virtual filesystem module 32, which, in turn, provides the status notification to the application program 30. After the PFS module 34 has provided the status notification to the virtual filesystem module 32, it (that is, the PFS module 34) can de-link the request data structure 41 from the active request list 42 and destroy it.

FIG. 4 schematically depicts structures useful in understanding the operation of the PFS input/output daemon 36 (FIG. 2). With reference to FIG. 4, the PFS input/output daemon 36 includes one or more client threads 50, a cache memory 51 and associated cache manager 52, and one or more device managers 53(1) through 53(D) (generally identified by reference numeral 53(d). Each device manager is associated with one or more storage devices 16(m)(d_m). The client threads 50 receive the access requests from the communication link 13, generates therefor a list of blocks on the respective storage devices which are needed for the request and passes the list to the cache manager 52. The cache manager 52, in turn, determines whether the blocks are in the cache memory 51. If the cache manager 52 determines that data from one or more blocks are not in the cache memory 52, it will enables the appropriate device manager 53(d) to retrieve the data and store it in the cache memory 51. In that process, the cache manager 52 will also will determine whether the data, when retrieved, is to be stored in a cache block which contains data which is to be stored on a storage device 16(d), and, if so enables the appropriate device manager 53(d) to initially perform a storage operation in connection therewith. In one embodiment, the cache manager 52 uses a conventional least-recently-used ("LRU") cache block replacement methodology to determine which cache block is to be selected to store data from a storage device block required for a request. After data from one or more blocks needed for a request have been stored in the cache memory, the cache manager 52 will notify a client thread 50 (which may be the same client thread that initially received the request, or a different client thread). The client thread 50, after receiving the notification from the cache manager 52, will continue processing the access request. If the access request is a retrieval request, the client thread 50 will transfer the data from the cache block(s) to the client computer 11(n) which issued the access request. On the other hand, if the access request is a storage request, the client thread 50 will initiate a transfer of the data to be stored from the client computer 11 (n) which issued the request, for storage in the cache block(s) in cache memory 51; as noted above, when a cache block is to be re-used, the cache manager 52 can then enable the data in the cache block to be stored in the appropriate storage device 16(m)(d), and so the data to be stored in response to a storage request will be actually stored on the storage device at that time.

The invention provides a number of advantages. In particular, the invention provides a PFS access subsystem in which communications between the client computer and server computer(s) on which the PFS is maintained are carried out in the user mode rather than in kernel mode, using conventional message passing routines. This can serve to isolate the operating system, which is executed in kernel mode, which can serve to reduce the likelihood, if a failure occurs in connection with the communication, the operating system will fail, resulting in failure in connection with processing of all programs on the computer. In the PFS access subsystem according to the invention, such a failure will merely result in failure in connection with just the PFS proxy daemon 35.

It will be appreciated that numerous modifications may be made to the PFS access subsystem as described above. For example, although the PFS access subsystem has been described as using MPI message passing libraries, it will be appreciated that other libraries, such as PVM, may be used.

In addition, although the PFS access subsystem has been described in connection with a client computer 11(n) and a remote server computer 12(m) interconnected by a communication link 13, it will be appreciated that the PFS access subsystem can be used on a single computer; that is, the PFS module 34, PFS proxy daemon and PFS input/output daemon(s) 36 can all be used on a single computer. In that case, the storage device(s) associated with the parallel filesystem can form part of the same computer, or be remote therefrom.

Furthermore, while the PFS proxy daemon 35 and PFS input/output daemon(s) 36 have been described as communicating using message passing, it will be appreciated that other mechanisms can be used in addition or instead. For example, if the PFS proxy daemon 35 and PFS input/output daemon(s) 36 are used on a single computer, they may communicate using conventional traditional shared memory mechanisms. On the other hand, if the PFS proxy daemon 35 and PFS input/output daemon(s) are used on different computers, they may communicate using remote or distributed shared memory mechanisms.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A parallel filesystem remote access subsystem facilitating remote access to files in a parallel filesystem in a digital computer network, the network including at least one client computer and a plurality of server computers interconnected by a communication link, each server computer storing a portion of at least one file in the parallel filesystem, the parallel filesystem remote access subsystem comprising:

A. associated with each server computer, a parallel filesystem input/output daemon configured to control processing of server access request messages received by said server computer over said communication link, the parallel filesystem input/output daemon being processed in the server computer's user mode; and B. associated with said client computer, a parallel filesystem module and a parallel filesystem proxy daemon,
   (i) the parallel filesystem module being configured to receive access requests generated to access said at least one file in the parallel filesystem and refer the access requests to the parallel filesystem proxy daemon,
   (ii) the parallel filesystem proxy daemon, in turn, being configured to generate server access request messages for transfer over the communication link,
   the client computer processing the parallel filesystem module in a privileged kernel mode and the parallel filesystem proxy daemon in an unprivileged user mode.

2. A parallel filesystem remote access subsystem as defined in claim 1 in which said parallel filesystem proxy daemon and said parallel filesystem input/output daemon are configured to communicate using messages according to an MPI message passing specification.

3. A parallel filesystem remote access subsystem as defined in claim 1 in which said parallel filesystem proxy daemon and said parallel filesystem input/output daemon are configured to communicate using messages according to a PVM message passing specification.

4. A parallel filesystem remote access subsystem as defined in claim 1 in which said parallel filesystem input/output daemon is configured to, after receiving a server access request message, process the access request by transferring data without use of the parallel filesystem proxy daemon.

5. A parallel filesystem remote access subsystem as defined in claim 1 in which:
   A. said parallel filesystem module is configured to, after receiving an access request, generate a request data structure therefor, and pass the request data structure to the parallel filesystem proxy daemon; and
   B. the parallel filesystem proxy daemon is configured to, after receiving a request data structure from said parallel filesystem module, identify ones of the server computers which store portions of the at least one file to be accessed in response to the access request, and generate server access request messages therefor.

6. The parallel filesystem remote access subsystem of claim 1 wherein the parallel filesystem module enqueues received access requests prior to referring the access requests to the parallel filesystem proxy daemon.

7. The parallel filesystem remote access subsystem of claim 1 wherein the parallel filesystem input/output daemon is configured to, after receiving a server access request message, process the access request by transferring data without use of the parallel filesystem module.

8. The parallel filesystem remote access subsystem of claim 1 wherein the parallel filesystem input/output daemon is configured to transfer data with a client computer over the communication link without intervention of other components.

9. The parallel filesystem remote access subsystem of claim 1 wherein the parallel filesystem input/output daemon runs on the server computer to support communication between the server computer and the client computer on behalf of the server computer.

10. The parallel filesystem remote access subsystem of claim 1 wherein the parallel filesystem module runs on the client computer to support communication between the client computer and a parallel filesystem input/output daemon running on the server computer.

11. The parallel filesystem remote access subsystem of claim 1 wherein the parallel filesystem proxy daemon, on behalf of the client computer, runs on the client computer to support communication between the client computer and a parallel filesystem input/output daemon running on the server computer.

12. A parallel filesystem remote access method facilitating remote access to files in a parallel filesystem in a digital computer network, the network including at least one client computer and a plurality of server computers interconnected by a communication link, each server computer storing a portion of at least one file in the parallel filesystem, the parallel filesystem remote access method comprising the steps of:
   A. in connection with each server computer, enabling a parallel filesystem input/output daemon to control processing of server access request messages received by said server computer over said communication link, the parallel filesystem input/output daemon being processed in the server computer's user mode; and
   B. in connection with a parallel filesystem module and a parallel filesystem proxy daemon associated with said client computer,
      (i) enabling the parallel filesystem module to receive access requests generated to access said at least one file in the parallel filesystem and refer the access requests to the parallel filesystem proxy daemon,
      (ii) enabling the parallel filesystem proxy daemon, in turn, to generating server access request messages for transfer over the communication link,
      the client computer processing the parallel filesystem module in a privileged kernel mode and the parallel filesystem proxy daemon in an unprivileged user mode.

13. A parallel filesystem remote access method as defined in claim 12 in which said parallel filesystem proxy daemon and said parallel filesystem input/output daemon communicate using messages according to an MPI message passing specification.

14. A parallel filesystem remote access method as defined in claim 12 in which said parallel filesystem proxy daemon and said parallel filesystem input/output daemon communicate using messages according to a PVM message passing specification.

15. A parallel filesystem remote access method as defined in claim 12 further including the step of enabling said parallel filesystem input/output daemon to, after receiving a server access request message, process the access request by transferring data without use of the parallel filesystem proxy daemon.

16. A parallel filesystem remote access method as defined in claim 12 further including the steps of:
   A. enabling said parallel filesystem module to, after receiving an access request, generate a request data structure therefor, and pass the request data structure to the parallel filesystem proxy daemon; and
   B. enabling the parallel filesystem proxy daemon to, after receiving a request data structure from said parallel filesystem module, identify ones of the server computers which store portions of the at least one file to be accessed in response to the access request, and generate server access request messages therefor.

17. The parallel filesystem remote access method of claim 12 wherein the parallel filesystem module enqueues received access requests prior to referring the access requests to the parallel filesystem proxy daemon.

18. The parallel filesystem remote access method of claim 12 wherein the parallel filesystem input/output daemon is configured to, after receiving a server access request message, process the access request by transferring data without use of the parallel filesystem module.

19. The parallel filesystem remote access method of claim 12 wherein the parallel filesystem input/output daemon is configured to transfer data with a client computer over the communication link without intervention of other components.

20. The parallel filesystem remote access method of claim 12 wherein the parallel filesystem input/output daemon runs on the server computer to support communication between the server computer and the client computer on behalf of the server computer.

21. The parallel filesystem remote access method of claim 12 wherein the parallel filesystem module runs on the client computer to support communication between the client computer and a parallel filesystem input/output daemon running on the server computer.

22. The parallel filesystem remote access method of claim 12 wherein the parallel filesystem proxy, on behalf of the client computer, runs on the client computer to support communication between the client computer and a parallel filesystem input/output daemon running on the server computer.

23. A computer program product for use in connection with a plurality of server computers and a client computer to provide a parallel filesystem remote access subsystem facilitating remote access to files in a parallel filesystem in a digital computer network, the network including the client computer and the server computers interconnected by a communication link, each server computer storing a portion of at least one file in the parallel filesystem, the computer program product comprising a computer readable medium having encoded thereon:
   A. a parallel filesystem input/output daemon module to provide, associated with each server computer, a parallel filesystem input/output daemon configured to enable the respective server computer to control processing of server access request messages received by said server computer over said communication link, the parallel filesystem input/output daemon being processed in the server computer's user mode; and
   B. a parallel filesystem module control module and a parallel filesystem proxy daemon module to respectively provide, associated with said client computer, a respective parallel filesystem module and a parallel filesystem proxy daemon,
      (i) the parallel filesystem module configured to enable the computer to receive access requests generated to access said at least one file in the parallel filesystem and refer the access requests to the parallel filesystem proxy daemon,
      (ii) the parallel filesystem proxy daemon, in turn, configured to enable the computer to generate server access request messages for transfer over the communication link,
      the client computer processing the parallel filesystem module in a privileged kernel mode and the parallel filesystem proxy daemon in an unprivileged user mode.

24. A parallel filesystem remote access subsystem as defined in claim 23 in which said parallel filesystem proxy daemon and said parallel filesystem input/output daemon are configured to enable the client computer and the respective server computer to communicate using messages according to an MPI message passing specification.

25. A parallel filesystem remote access subsystem as defined in claim 23 in which said parallel filesystem proxy daemon and said parallel filesystem input/output daemon are configured to enable the client computer and the respective server computer to communicate using messages according to a PVM message passing specification.

26. A parallel filesystem remote access subsystem as defined in claim 23 in which said parallel filesystem input/output daemon is configured to enable the respective server computer to, after receiving a server access request message, process the access request by transferring data without use of the parallel filesystem proxy daemon.

27. A parallel filesystem remote access subsystem as defined in claim 23 in which:
   A. said parallel filesystem module is configured to enable the client computer to, after receiving an access request, generate a request data structure therefor, and pass the request data structure to the parallel filesystem proxy daemon; and
   B. the parallel filesystem proxy daemon is configured to enable the client computer to, after receiving a request data structure from said parallel filesystem module, identify ones of the server computers which store portions of the at least one file to be accessed in response to the access request, and generate server access request messages therefor.

28. The parallel filesystem remote access subsystem of claim 23 wherein the parallel filesystem module enqueues received access requests prior to referring the access requests to the parallel filesystem proxy daemon.

29. The parallel filesystem remote access subsystem of claim 23 wherein the parallel filesystem input/output daemon is configured to, after receiving a server access request message, process the access request by transferring data without use of the parallel filesystem module.

30. The parallel filesystem remote access subsystem of claim 23 wherein the parallel filesystem input/output daemon is configured to transfer data with a client computer over the communication link without intervention of other components.

31. The parallel filesystem remote access subsystem of claim 23 wherein the parallel filesystem input/output daemon runs on the server computer to support communication between the server computer and the client computer on behalf of the server computer.

32. The parallel filesystem remote access subsystem of claim 23 wherein the parallel filesystem module runs on the client to support communication between the client computer and a parallel filesystem input/output daemon running on the server computer.

33. The parallel filesystem remote access subsystem of claim 23 wherein the parallel filesystem proxy daemon, on behalf of the client computer, runs on the client computer to support communication between the client computer and a parallel filesystem input/output daemon running on the server computer.

* * * * *